United States Patent
Stayner et al.

(10) Patent No.: US 11,669,786 B2
(45) Date of Patent: Jun. 6, 2023

(54) ON-DEMAND TRANSPORT SERVICES

(71) Applicant: Uber Technologies, Inc., San Francisco, CA (US)

(72) Inventors: Donald Stayner, San Francisco, CA (US); Nikhil Dua, San Francisco, CA (US); Jake Hurley, San Francisco, CA (US); Eric Li, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 238 days.

(21) Appl. No.: 16/791,540

(22) Filed: Feb. 14, 2020

(65) Prior Publication Data

US 2021/0256437 A1    Aug. 19, 2021

(51) Int. Cl.
*G06Q 10/0631* (2023.01)
*G06F 16/9035* (2019.01)

(52) U.S. Cl.
CPC ... *G06Q 10/06311* (2013.01); *G06F 16/9035* (2019.01)

(58) Field of Classification Search
CPC ............ G06Q 10/06311; G06F 16/9035
USPC .......................................................... 705/13
See application file for complete search history.

(56) References Cited

U.S. PATENT DOCUMENTS

| | | |
|---|---|---|
| 4,023,753 A | 5/1977 | Dobler |
| 5,953,706 A | 9/1999 | Patel |
| 6,608,566 B1 | 8/2003 | Davis |
| 6,756,913 B1 | 6/2004 | Ayed |
| 6,832,092 B1 | 12/2004 | Suarez |
| 7,522,995 B2 | 4/2009 | Nortrup |
| 7,840,427 B2 | 11/2010 | O'Sullivan |
| 7,970,749 B2 | 6/2011 | Uhlir |
| 8,412,667 B2 | 4/2013 | Zhang |
| 8,630,987 B2 | 1/2014 | Dhuse |
| 8,762,048 B2 | 6/2014 | Kosseifi |
| 8,775,070 B1 | 7/2014 | Bhatia |
| 9,070,101 B2 | 6/2015 | Abhayanker |

(Continued)

FOREIGN PATENT DOCUMENTS

| | | |
|---|---|---|
| CN | 106651728 | 5/2017 |
| DE | 10201607712 | 11/2016 |

(Continued)

OTHER PUBLICATIONS

"T-Finder: A Recommender System for Finding Passengers and Vacant Taxis" Published by IEEE (Year: 2013).*

(Continued)

*Primary Examiner* — Zeina Elchanti
(74) *Attorney, Agent, or Firm* — Mahamedi IP Law LLP

(57) ABSTRACT

A computing system can process utilization data from computing devices of requesting users of a transport service and identify a plurality of the requesting users being transported by a third-party transit means, such as a train, bus, or ferry, to an arrival location. For each of the plurality of requesting users, the system can determine a destination requiring additional transport from the arrival location of the third-party transit means. Based on the destination of each of the plurality of requesting users, the system can coordinate with a set of transport providers within a certain proximity of the arrival location of the transit means to facilitate transport for the plurality of requesting users at the arrival location.

14 Claims, 5 Drawing Sheets

(56) References Cited

U.S. PATENT DOCUMENTS

| | | | |
|---|---|---|---|
| 9,534,912 B2 | 1/2017 | Lord | |
| 9,911,170 B2 | 3/2018 | Kim | |
| 9,939,279 B2 | 4/2018 | Pan | |
| 10,074,065 B2 | 9/2018 | Jones | |
| 10,082,793 B1 | 9/2018 | Glaser | |
| 10,152,053 B1 | 12/2018 | Smith | |
| 10,178,890 B1 | 1/2019 | Andon | |
| 10,203,212 B2 | 2/2019 | Mazzella | |
| 10,458,801 B2 | 10/2019 | Lord | |
| 10,535,271 B1* | 1/2020 | Dyer | G06Q 50/30 |
| 10,572,964 B2 | 2/2020 | Kim | |
| 10,721,327 B2 | 7/2020 | Cheng | |
| 11,196,838 B2 | 12/2021 | Cheng | |
| 2001/0037174 A1 | 11/2001 | Dickerson | |
| 2002/0099599 A1* | 7/2002 | Minassian | G06Q 10/08 |
| | | | 705/13 |
| 2003/0058082 A1 | 3/2003 | Mallick | |
| 2004/0158483 A1 | 8/2004 | Lecouturier | |
| 2004/0225520 A1 | 11/2004 | Aoki et al. | |
| 2005/0227704 A1 | 10/2005 | Ferra | |
| 2005/0278063 A1 | 12/2005 | Hersh | |
| 2005/0278192 A1 | 12/2005 | Cantini et al. | |
| 2006/0023569 A1 | 2/2006 | Agullo | |
| 2006/0034201 A1 | 2/2006 | Umeda | |
| 2006/0059023 A1 | 3/2006 | Mashinsky | |
| 2006/0155460 A1 | 7/2006 | Raney | |
| 2006/0293937 A1 | 12/2006 | Sohm | |
| 2007/0150375 A1 | 6/2007 | Yang | |
| 2008/0014908 A1 | 1/2008 | Vasant | |
| 2008/0027772 A1 | 1/2008 | Gernega | |
| 2008/0033633 A1 | 2/2008 | Akiyoshi | |
| 2008/0177584 A1 | 7/2008 | Altaf et al. | |
| 2008/0195428 A1 | 8/2008 | O'Sullivan | |
| 2008/0208441 A1 | 8/2008 | Cheung | |
| 2008/0270019 A1 | 10/2008 | Anderson | |
| 2008/0277183 A1 | 11/2008 | Huang | |
| 2008/0319644 A1 | 12/2008 | Zehler | |
| 2009/0005963 A1 | 1/2009 | Jarvinen | |
| 2009/0030885 A1 | 1/2009 | DePasquale | |
| 2009/0119006 A1* | 5/2009 | Silver | G08G 5/0095 |
| | | | 701/465 |
| 2009/0150514 A1* | 6/2009 | Davis | H04L 67/327 |
| | | | 709/217 |
| 2009/0156241 A1 | 6/2009 | Staffaroni | |
| 2009/0176508 A1 | 7/2009 | Lubeck | |
| 2009/0192851 A1 | 7/2009 | Bishop | |
| 2009/0216600 A1 | 8/2009 | Hill | |
| 2009/0248587 A1 | 10/2009 | Van Buskirk | |
| 2010/0070168 A1 | 3/2010 | Sumcad | |
| 2010/0074383 A1 | 3/2010 | Lee | |
| 2010/0153279 A1 | 6/2010 | Zahn | |
| 2010/0211498 A1 | 8/2010 | Aabye et al. | |
| 2011/0099040 A1 | 4/2011 | Felt | |
| 2011/0225257 A1 | 9/2011 | Tilden et al. | |
| 2011/0238755 A1 | 9/2011 | Khan | |
| 2011/0246246 A1 | 10/2011 | Johnson | |
| 2011/0251951 A1 | 10/2011 | Kolkowitz et al. | |
| 2012/0023294 A1 | 1/2012 | Resnick | |
| 2012/0041675 A1 | 2/2012 | Juliver | |
| 2012/0072249 A1 | 3/2012 | Weir et al. | |
| 2012/0203599 A1 | 8/2012 | Choi | |
| 2012/0232943 A1 | 9/2012 | Myr | |
| 2012/0233246 A1 | 9/2012 | Guernez | |
| 2012/0239452 A1 | 9/2012 | Trivedi | |
| 2012/0253548 A1 | 10/2012 | Davidson | |
| 2012/0265580 A1 | 10/2012 | Kobayashi | |
| 2012/0290337 A1 | 11/2012 | Helmy | |
| 2012/0290950 A1 | 11/2012 | Rapaport | |
| 2013/0018795 A1 | 1/2013 | Kolhatkar et al. | |
| 2013/0054281 A1 | 2/2013 | Thakkar | |
| 2013/0110392 A1 | 5/2013 | Kosseifi | |
| 2013/0144831 A1 | 6/2013 | Atlas | |
| 2013/0215843 A1 | 8/2013 | Diachina | |
| 2013/0218455 A1 | 8/2013 | Clark | |
| 2013/0226365 A1 | 8/2013 | Brozovich | |
| 2014/0025410 A1 | 1/2014 | Churchman et al. | |
| 2014/0074536 A1 | 3/2014 | Meushar | |
| 2014/0095221 A1* | 4/2014 | Lore | G06Q 30/02 |
| | | | 705/5 |
| 2014/0129302 A1 | 5/2014 | Amin et al. | |
| 2014/0129951 A1 | 5/2014 | Amin | |
| 2014/0149157 A1 | 5/2014 | Shaam et al. | |
| 2014/0149441 A1 | 5/2014 | Wang | |
| 2014/0172727 A1 | 6/2014 | Abhyanker | |
| 2014/0173511 A1 | 6/2014 | Lehmann | |
| 2014/0207375 A1 | 7/2014 | Lerenc | |
| 2014/0378118 A1 | 12/2014 | Mohebbi | |
| 2014/0378159 A1 | 12/2014 | Dolbakian | |
| 2015/0032485 A1 | 1/2015 | Nelson | |
| 2015/0055178 A1 | 2/2015 | Ishibashi | |
| 2015/0073645 A1 | 3/2015 | Davidsson | |
| 2015/0081581 A1 | 3/2015 | Gishen | |
| 2015/0100238 A1 | 4/2015 | Cai | |
| 2015/0154810 A1 | 6/2015 | Tew | |
| 2015/0161554 A1 | 6/2015 | Sweeney | |
| 2015/0161698 A1 | 6/2015 | Jones | |
| 2015/0176997 A1 | 6/2015 | Pursche | |
| 2015/0204684 A1 | 7/2015 | Rostamian | |
| 2015/0206267 A1 | 7/2015 | Khanna | |
| 2015/0254581 A1 | 9/2015 | Brahme | |
| 2015/0262430 A1 | 9/2015 | Farrelly | |
| 2015/0294238 A1 | 10/2015 | Benque | |
| 2015/0323327 A1 | 11/2015 | Lord | |
| 2015/0323330 A1 | 11/2015 | Lord | |
| 2015/0323331 A1 | 11/2015 | Lord | |
| 2015/0339923 A1 | 11/2015 | Konig | |
| 2015/0339928 A1 | 11/2015 | Ramanujam | |
| 2015/0352128 A1 | 11/2015 | Villa et al. | |
| 2015/0371157 A1* | 12/2015 | Jaffe | G06Q 10/025 |
| | | | 705/6 |
| 2015/0379437 A1* | 12/2015 | Reich | G06Q 10/02 |
| | | | 705/5 |
| 2016/0013987 A1 | 1/2016 | George | |
| 2016/0019496 A1 | 1/2016 | Gorlin | |
| 2016/0026936 A1 | 1/2016 | Richardson | |
| 2016/0027307 A1 | 1/2016 | Abhyanker | |
| 2016/0055605 A1* | 2/2016 | Kim | G06Q 10/04 |
| | | | 701/465 |
| 2016/0066004 A1 | 3/2016 | Lieu | |
| 2016/0132792 A1 | 5/2016 | Rosnow | |
| 2016/0138928 A1 | 5/2016 | Guo | |
| 2016/0148167 A1 | 5/2016 | Li | |
| 2016/0231129 A1 | 8/2016 | Erez | |
| 2016/0301698 A1 | 10/2016 | Katara | |
| 2016/0321771 A1 | 11/2016 | Liu | |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1 | 12/2016 | Cao | |
| 2016/0370194 A1 | 12/2016 | Colijn | |
| 2017/0083832 A1 | 3/2017 | Williams | |
| 2017/0115125 A1 | 4/2017 | Outwater | |
| 2017/0126837 A1 | 5/2017 | Wang | |
| 2017/0147951 A1 | 5/2017 | Meyer | |
| 2017/0147959 A1 | 5/2017 | Sweeney | |
| 2017/0169366 A1 | 6/2017 | Klein | |
| 2017/0169535 A1 | 6/2017 | Tolkin | |
| 2017/0191841 A1 | 7/2017 | Marueli | |
| 2017/0191845 A1 | 7/2017 | Marueli | |
| 2017/0200249 A1 | 7/2017 | Ullrich | |
| 2017/0240098 A1 | 8/2017 | Sweeney | |
| 2017/0255881 A1 | 9/2017 | Ritch | |
| 2017/0270794 A1 | 9/2017 | Sweeney | |
| 2017/0272901 A1 | 9/2017 | Sweeney | |
| 2017/0344643 A1* | 11/2017 | Ramesan | G06Q 50/01 |
| 2018/0005145 A1 | 1/2018 | Lo | |
| 2018/0060838 A1 | 3/2018 | Agrawal | |
| 2018/0091604 A1 | 3/2018 | Yamashita | |
| 2018/0101925 A1 | 4/2018 | Brinig | |
| 2018/0121835 A1* | 5/2018 | Salonen | G06Q 10/025 |
| 2018/0121847 A1* | 5/2018 | Zhao | G06Q 10/06315 |
| 2018/0211351 A1 | 7/2018 | Kim | |
| 2018/0306595 A1 | 10/2018 | Marueli | |
| 2018/0315148 A1 | 11/2018 | Luo | |

(56) References Cited

U.S. PATENT DOCUMENTS

| | | |
|---|---|---|
| 2018/0321049 A1 | 11/2018 | Lim |
| 2018/0339714 A1 | 11/2018 | Smid |
| 2018/0349825 A1 | 12/2018 | Yamamoto |
| 2018/0356239 A1 | 12/2018 | Marco |
| 2018/0374350 A1 | 12/2018 | Sweeney |
| 2019/0172353 A1 | 6/2019 | Chen |
| 2019/0206009 A1 | 7/2019 | Gibson |
| 2019/0212157 A1 | 7/2019 | Wu |
| 2019/0244318 A1 | 8/2019 | Rajcok |
| 2019/0265703 A1 | 8/2019 | Hicok |
| 2019/0311629 A1 | 10/2019 | Sierra |
| 2019/0340554 A1 | 11/2019 | Jaffe |
| 2019/0347754 A1 | 11/2019 | Dicker |
| 2020/0041286 A1 | 2/2020 | Lord |
| 2020/0041291 A1 | 2/2020 | Dunnette |
| 2020/0104761 A1 | 4/2020 | Aich |
| 2020/0211070 A1 | 7/2020 | Singh |
| 2020/0027368 A1 | 8/2020 | Bhattacharyya |
| 2020/0258344 A1 | 8/2020 | Brinig |
| 2020/0272965 A1 | 8/2020 | Tanabe |
| 2020/0273337 A1 | 8/2020 | Sweeney |
| 2020/0322451 A1 | 10/2020 | Cheng |
| 2020/0334987 A1 | 10/2020 | Shoval |
| 2021/0010817 A1 | 1/2021 | Wu |
| 2021/0048300 A1 | 2/2021 | Saavreda Roman |
| 2021/0256437 A1 | 8/2021 | Stayner |
| 2021/0312338 A1 | 10/2021 | Stayner |

FOREIGN PATENT DOCUMENTS

| | | |
|---|---|---|
| EP | 2293523 | 3/2011 |
| EP | 3046058 | 7/2016 |
| GB | 2367979 | 4/2002 |
| JP | 2004-192366 | 7/2004 |
| JP | 2004-302942 | 10/2004 |
| JP | 2010-286908 | 12/2010 |
| JP | 2001-188996 | 7/2011 |
| JP | 2012-194687 | 10/2012 |
| JP | 2013-175144 | 9/2013 |
| KR | 10-2012-0079549 | 6/2012 |
| WO | WO 2002/006994 | 1/2002 |
| WO | WO 2011/069170 | 6/2011 |
| WO | WO 2011-120161 | 10/2011 |
| WO | WO 2017/079222 | 5/2017 |

OTHER PUBLICATIONS

Introducing Scheduled Rides: Plan Your Trip in Advance—Lyft Blog; https://blog.lyft.com/posts/introducing-scheduled-rides, May 23, 2016.
How does Uber Work? available at https://help.uber.com/h/738d1ff7-5fe0-4383-b34c-4a2480efd71e (Year: 2016).
ISR and Written Opinion dated Sep. 14, 2017 in PCT/US2017/036430.
EESR in 15809070.4 dated Nov. 8, 2017.
ISR and Written Opinion dated Nov. 21, 2018 in PCT/2018/046257.
Office Action in EP 15809070.4 dated Sep. 27, 2018.
ISR/Written Opinion in International Application No. PCT/US2015/046388, dated Nov. 17, 2015.
EESR in EP Application No. 15833693.3 dated Jan. 18, 2018.
Office Action dated Sep. 20, 2018 in EP 15833693.3.
EESR in EP 19165275.9 dated Apr. 18, 2019.
Written Opinion dated Jul. 26, 2019 in PCT/US2018/046257.

* cited by examiner

ON-DEMAND TRANSPORT SERVICES

BACKGROUND

Public transport riders often require additional transport upon arriving at fixed stations to get them to their respective destinations. However, when popular stations experience a mass outflow of riders (e.g., from trains) that require additional transport, traffic congestion and confusion can result in increased delays.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
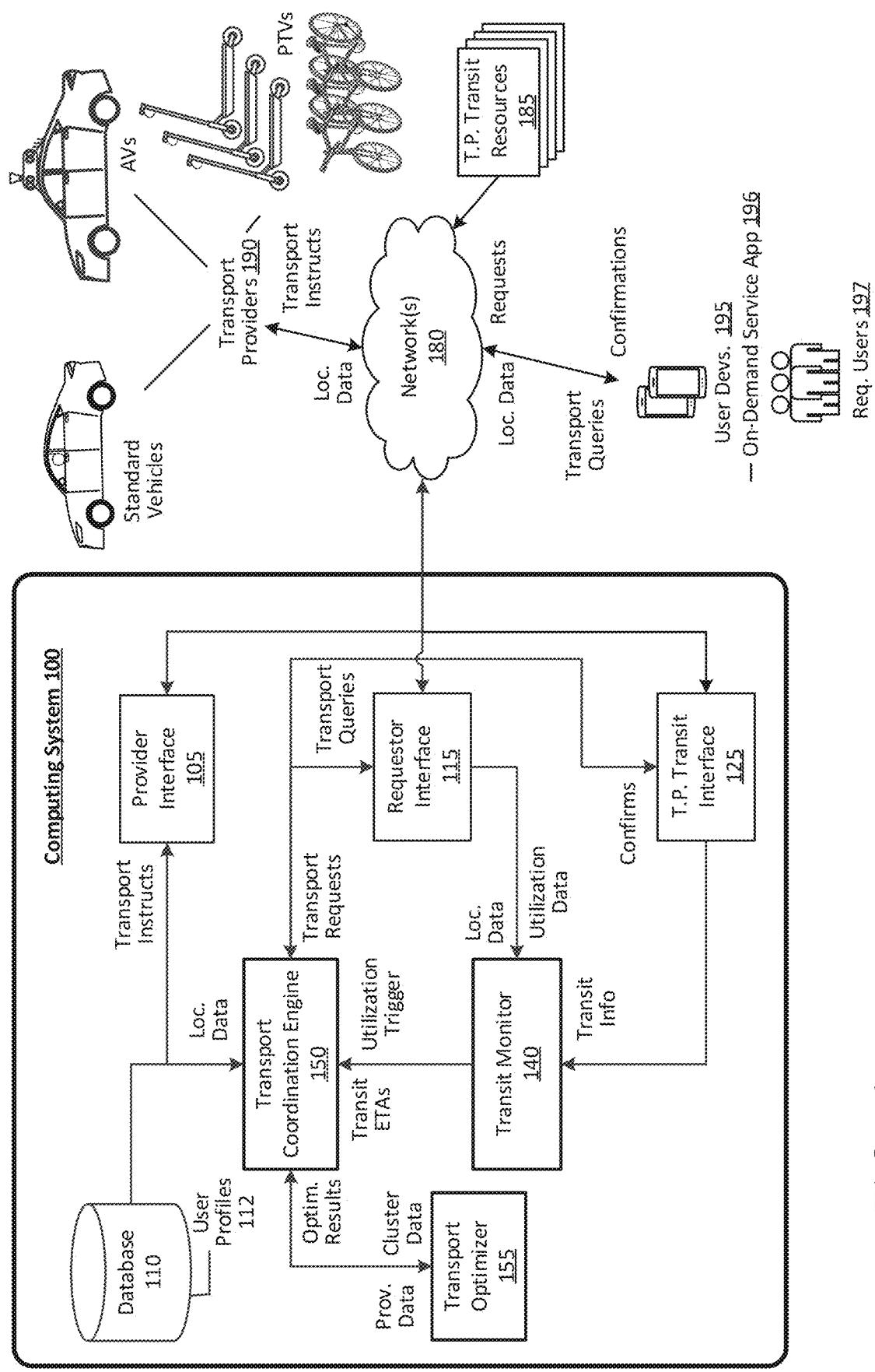
FIG. 1 is a block diagram illustrating an example computing system implementing an on-demand coordinated transport service, in accordance with examples described herein.

A computing system can implement on-demand transport services in which user intent to utilize the transport service is identified well prior to the start of the user's actual utilization of the transport service. It is contemplated that the earlier a user's intent can be determined and confirmed, the earlier the computing system can optimally arrange transport for the user to a requested destination. Current applications of rideshare services involve a received transport request from a requesting user, which triggers the computing system to identify a set of candidate drivers, and then select a driver from the candidate set to rendezvous with the user and transport the user to a destination. Examples described herein involve the early identification of the user's intent to utilize the service prior to receiving a transport request, which provides the computing system with increased transport supply planning for the service's early intent users.

Certain scenarios enable early intent detection by the computing system, such as when upcoming requesters are currently being transported by third-party transit means, such as planes, trains, ferries, and buses that travel fixed or quasi-fixed routes and include known stopping locations. For example, the computing system can identify that several users are currently riding a train to an end location or stopping location. In certain implementations, the system can store a user profile for each user, comprising historical utilization data that indicates frequent destinations, home locations, work locations, and other historical usage patterns corresponding to the user's utilization of the transport service. In such a scenario, the computing system can perform transport supply shaping techniques for the stopping location of the train and even further down the various paths to the final destinations of the transiting users.

According to various implementations, the computing system can detect the intent to utilize the transport service by detecting, via location data received from the computing devices of a set of users, a cluster of users moving at a given speed and trajectory, indicating a common third-party transit means being currently utilized (e.g., a public bus or train). These location data may be received via an executing application specific to the on-demand transport services. It has been observed that when users interact with such an application, there is a high probability (e.g., 94%) that the user will engage the service by requesting on-demand transport upon arrival. More personalized information stored in the user profile of each user may provide an even greater certainty of whether the user will engage the service at the stopping location of the third-party transit means, and can further indicate transport preferences or aspects such as price sensitivity, time sensitivity, willingness to utilize electric scooters, bicycles, and the like.

The computing system can determine a stopping time of the third-party transit means and "shape" the supply of transport options at the stopping location prior to arrival of the third-party transit means. As used herein, "shaping" the supply of transport at the stopping location means preemptively configuring various transport options to be available at the stopping location based on the distance, estimated time of arrival, and/or other factors such as distance and elevation changes to the final destination of each user, availability of transport providers (e.g., drivers and AVs), availability and location of electric scooters or bicycles, and the preferences or willingness to utilize different modes of transport by the transiting users. The computing system may then perform a transport supply optimization to determine the optimal usage of transport options for the cluster of transiting users having a common egress location (e.g., a train station), and perform collective supply coordination to ensure that the optimal configuration of transport options are available to the transiting users when they arrive.

In performing the transport optimization, the computing system can—for each user—select between carpool, standard rideshare (e.g., single passenger transport), bicycles, electric bicycles, electric scooters, high-capacity vehicles (e.g., vans), and the like. As described, these selections can be made based on the user's preferences, active querying, willingness or permissions, and/or tolerances. In some aspects, these may be predetermined based on a selectable setting on the app, or queried prior to arrival. The computing system may then remotely coordinate the transport for the stopping location (e.g., scooter and/or bicycle drop-off, transport invites to drivers and/or AVs, etc.), and transmit content data to the computing devices of the transiting users to confirm a dedicated transport option at the arrival location for the user to transport the user to an inferred or selected destination.

In certain implementations, the computing system can further coordinate multi-modal transport for transiting users, which can include one or more additional stops between the arrival location of the third-party transit means to the final destination of the user. For example, a user with an extensive commute between the arrival location and final destination can be first matched with a number of carpool riders to a certain location, where the user may be matched with an available electric scooter for transport to the user's destination. Additionally, the computing system can also detect and account for delays in the third-party transit means through timing and supply shaping techniques described herein.

Among other benefits, examples described herein achieve a technical solution to current technical problems experienced in the field of remote, on-demand transport services. In particular, the computing system described herein can remotely monitor transit means—such as trains, buses, planes, ferries, and the like—determine destination intentions of riders of the transit means while in-transit to an egress location, and pre-configure and coordinate on-demand transport modes for the riders when they egress the third-party transit means. In doing so, the computing system described herein can anticipate transport demand at egress locations, such as train stations, bus stations, airports, ferry terminals, and the like, in order to provide seamless transport for transit riders and reduce congestion at such egress locations.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing system implementing an on-demand coordinated transport service, in accordance with examples described herein. In various examples, the computing system 100 can include a requestor interface 115 to communicate, over one or more networks 180, with computing devices 195 of requesting users 197. For example, the computing system 100 can communicate via an executing on-demand service application 196 on the computing devices 195 of the users 197 to enable the users 197 to configure and transmit transport requests for on-demand transport services. In various examples, the computing devices 195 of the users 197 can also transmit location data to the computing system 100 to enable the computing system 100 to perform selection optimizations for matching the user with transport providers, such as drivers and autonomous vehicles.

The computing system 100 can also include a provider interface 105 to communicate, over the one or more networks 180, with computing devices corresponding to various transport providers 190 that are available to provide transport services for the requesting users 197 on demand. In various examples, the communications with the various transport providers 190 can correspond to transport invitations and/or repositioning requests to drivers of standard human-driven vehicles, transport instructions to autonomous vehicles, instructions to drivers of high capacity distribution vehicles to drop off or pick up personal transport vehicles (e.g., manual bicycles, hybrid bicycles, electric scooters, etc.), and/or lock and unlock commands to the personal transport vehicles (e.g., for authentication by a particular user 197 to unlock a bicycle or scooter).

According to examples described herein, the computing system 100 can further include a third-party transit interface 125 to communicate, over the one or more networks 180, with third-party transit resources 185 to determine schedules and transit information of entities operating or otherwise monitoring third-party transit means, such as trains, buses, flights, boat ferries, and the like. Such transit information can provide established schedules, routes, and dynamic information, such as delays, construction information, detours, cancelations, etc. to the computing system 100 in order to enable the computing system 100 to plan and configure transport supply at egress locations of the third-party transit means. These egress locations can comprise bus stops, bus stations, train stations, airport terminals, ferry terminals, and the like.

According to various examples, the computing system 100 can include a transit monitor 140 that accesses or otherwise receives the transit information from the third-party transit resources 185 to determine the transit schedules of the third-party transit means throughout a particular region (e.g., a metropolitan area for which the computing system 100 coordinates on-demand transport, such as the Washington D.C.-Baltimore metroplex). In certain implementations, the transit monitor 140 can further receive the location data from the computing devices 195 of the requesting users 197 to, for example, determine whether a cluster of users 197 are currently riding on a third-party transit means, such as a train, and dynamically determine the ETA of the train to any given station at which a cluster of users 197 will disembark.

In one example, the transit monitor 140 can further receive utilization data from the computing devices 195 of the requesting users 197. The utilization data can correspond to the user's current interactions with the executing service application 196, which can indicate a future desire to request transport at an arrival location of the third-party transit means. Specifically, empirical analysis of historical utilization data of users indicates a high conversion rate (e.g., 94%) of users 197 opening the service application 196 on their computing devices 195 and requesting transport, versus users 197 opening the service application 196 and not requesting transport within a certain amount of time (e.g., fifteen minutes). Accordingly, the utilization data from the service application 196 executing on the computing devices 195 of transiting users 197 can provide the transit monitor 140 with a relatively high probability that any user 197 interacting with the service application 196 while in transit will most likely request transport at an arrival location of the third-party transit means.

In certain implementations, when the transit monitor 140 identifies a cluster of users 197 currently in transit on a third-party transit means, the transit monitor 140 can further monitor the user devices 195 for utilization data indicating any user's interactions with the service application 196. In some aspects, when utilization of the service application 196 is detected, the transmit monitor 140 can transmit a utilization trigger to a transport coordination engine 150 of the computing system 100. In further aspects, the transit monitor 140 can process the location data from the computing devices 195 of the cluster of transiting users 197 to update or confirm, at any time, an ETA of the third-party transit means (e.g., a train) to any particular arrival location (e.g., a train station), and transmit the updated ETA information to the transport coordination engine 150.

In one or more examples, upon receiving the utilization trigger from the transit monitor 140, the transport coordination engine 150 can identify the transiting users 197 currently utilizing the service application 196, and transmit a set of transport queries to the user's computing device 195 (e.g., as push notifications via the service application 196) to determine a final destination of the user 197, an arrival location of the third-party transit means at which the user 197 will disembark, and/or a transport preference for transporting the user 197 from the arrival location to the final destination (e.g., a private car, luxury vehicle, carpool, or personal transport). It is contemplated that the transport coordination engine 150 can perform such queries for each transiting user 197 of any third-party transit means throughout the transport service region, in order to perform the transport supply shaping techniques described herein.

It is further contemplated that one or more of the queried notifications can instead be inferred by the transport coordination engine 150. In particular, the computing system 100 can include a database 110 storing user profiles 112 for the requesting users 197. In various applications, the user profile 112 for any particular user 197 can comprise historical utilization data corresponding to the user's historical usage of the on-demand transport service. These data can include common destinations of the user 197 (e.g., a work location, home location, train station, bus station, airport, ferry terminal, etc.), common pick-up locations, commonly used transport services (e.g., scooters, bicycles, standard rideshare, carpool rideshare, etc.), and any default permissions or preferences of the user 197.

In some aspects, the permissions or preferences of the user 197 can indicate a willingness to use personal transport, such as scooters and bicycles (e.g., up to a predefined distance). Additionally or alternatively, the transport coordination engine 150 can query for this information while the user 197 is in transit. Given a current time of day, day of the week, and the route and direction of travel of the third-party transit means, the transport coordination engine 150 can infer an arrival location of the transit means and a final destination of the user 197 using the user's profile 112. In such examples, the transport coordination engine 150 can transmit a simple confirmation query providing the user 197 with the inferred information and asking the user 197 to confirm the arrival location, final destination, and/or transport mode preference.

When the arrival location of the third-party transit means, the final destinations, and the transport permissions or preferences are known for a cluster of the transiting users 197 (hereinafter "cluster data"), the transport coordination engine 150 can provide this information to a transport optimizer 155. As provided above, any portion of the cluster data can be inferred using the historical data in the user profile 112 of any of the transiting users 197 or can be actively queried through the service application 196. The transport optimizer 155 can further receive transport provider information, such as the locations of transport providers (e.g., AVs, carpool drivers, and standard rideshare drivers), the status of each transport provider (e.g., on-trip, available, off-duty), the locations of high capacity distribution vehicles, their inventory of scooters and/or bicycles, and their current distribution schedules (hereinafter "provider data"). The transport optimizer 155 can process the provider data and the cluster data to output optimization results indicating an optimal configuration of transport supply at the arrival location of the third-party transit means.

In various examples, the optimization results can indicate the optimal number or ratio of carpool vehicles, standard rideshare vehicles, electric scooters, bikes, and any other optional transport modes to be sent to and/or available at the arrival location for the transiting users 197 prior to or just after their arrival (e.g., to minimize wait times for the users 197 and/or transport providers 190). For example, with a given ETA of the third-party transit means to the arrival location, the transport optimizer 155 can determine a feasibility of coordinating each of the available transport options to be available when or nearly when the third-party transit means arrives such that the collective wait times of the arriving users 197 is minimized. In variations, the transport optimizer 155 can determine the most optimal configuration of transport modes at the arrival location such that a general or overall logical cost is minimized (e.g., factoring in user and driver wait times, financial cost, transport resource disutility cost of unused scooters, bicycles, and/or drivers, and the like).

In various aspects, the optimization results can further indicate an optimal set of matches between each of the transiting users 197 and the transport options at the arrival location. These matches can include carpool matches of transiting users 197 that have a common route or near-common route to their respective destinations. For carpool matches, the transport optimizer 155 can also account for the capacity of available carpool vehicles. For example, an available medium or high capacity vehicle (e.g., a mini-van or full-sized van) may hold more than three users 197. In such a scenario, the transport coordination engine 150 can identify three or more transiting users 197 with final destinations that align with a particular route, and match these users 197 to the same medium or high capacity carpool vehicle.

The matches can further include a user match to an electric scooter or bicycle in general or an assigned scooter or bicycle, which the computing system 100 can remotely lock or unlock upon authentication by the user 197. In certain implementations, the transport coordination engine 150 can provide the user 197 with a multi-mode form of transport to the user's final destination based on the optimization results. In such implementations, the user 197 may have a common leg of a journey to the user's destination as compared to other transiting users 197, and may be carpool matched to those other users 197 up to an end point of the common leg—at which point the user 197 may be matched to an e-scooter or other personal transport vehicle (PTV) for a remainder of the journey.

Upon receiving the optimization results, the transport coordination engine 150 can coordinate with the various transport providers 190 to be available to provide transport for the transiting users 197 when they arrive. In certain implementations, the transport coordination engine 150 can transmit transport facilitation requests (e.g., instructions and/or invitations) to the computing devices of selected drivers, AVs, and/or drivers of distribution vehicles to configure the transport supply at the arrival location in accordance with the optimization results from the transport optimizer 155. Accordingly, the transport coordination engine 150 can perform supply shaping techniques in a timed manner such that the transport providers 190 are either briefly waiting at the arrival location or en-route to the arrival location when the transiting users 197 disembark from the third-party transit means.

In further implementations, the transport coordination engine 150 can pre-match the transiting users 197 to specified transport providers 190 while the users 197 are in transit (e.g., twenty minutes before arrival). The transport coordination engine 150 may then coordinate with the transport providers 190, providing transport invitations to drivers, and instructing drivers of distribution vehicles to drop-off a certain number of personal transport vehicles at a certain area within the arrival location. When the transit means is near arrival (e.g., within two minutes), the transport coordination engine 150 can update the matches (e.g., accounting for any declined invitations, cancelations by drivers, or delays by any of the transport providers 190), and transmit confirmations of the updated matches to the transiting users 197. The updated matches can indicate a matched transport mode (e.g., a scooter or bicycle), a matched driver and vehicle, a matched carpool vehicle, or matched AV. Upon egressing the transit means, each requesting user 197 can be provided with the match information and/or a granular walking route to travel in order to rendezvous with the matched transport provider 190.

Upon arriving at the arrival location, the third-party transit means may continue traveling to additional arrival locations (e.g., stations, terminals, stops, etc.) carrying additional users 197, which the computing system 100 can continue to perform supply shaping optimization techniques described herein. Thus, it is contemplated that pickup locations at mass transit egress areas—which currently experience significant traffic congestion due to a lack of knowledge of user intent and preemptive planning—can be optimized for reduced or eliminated wait times and significantly reduced traffic congestion. Furthermore, the computing system 100 can perform such supply shaping optimization for any given mass transit egress location within a given transport service region, which can include any bus station, train station, ferry terminal, or airport terminal.

Computing Device

Figure 2:
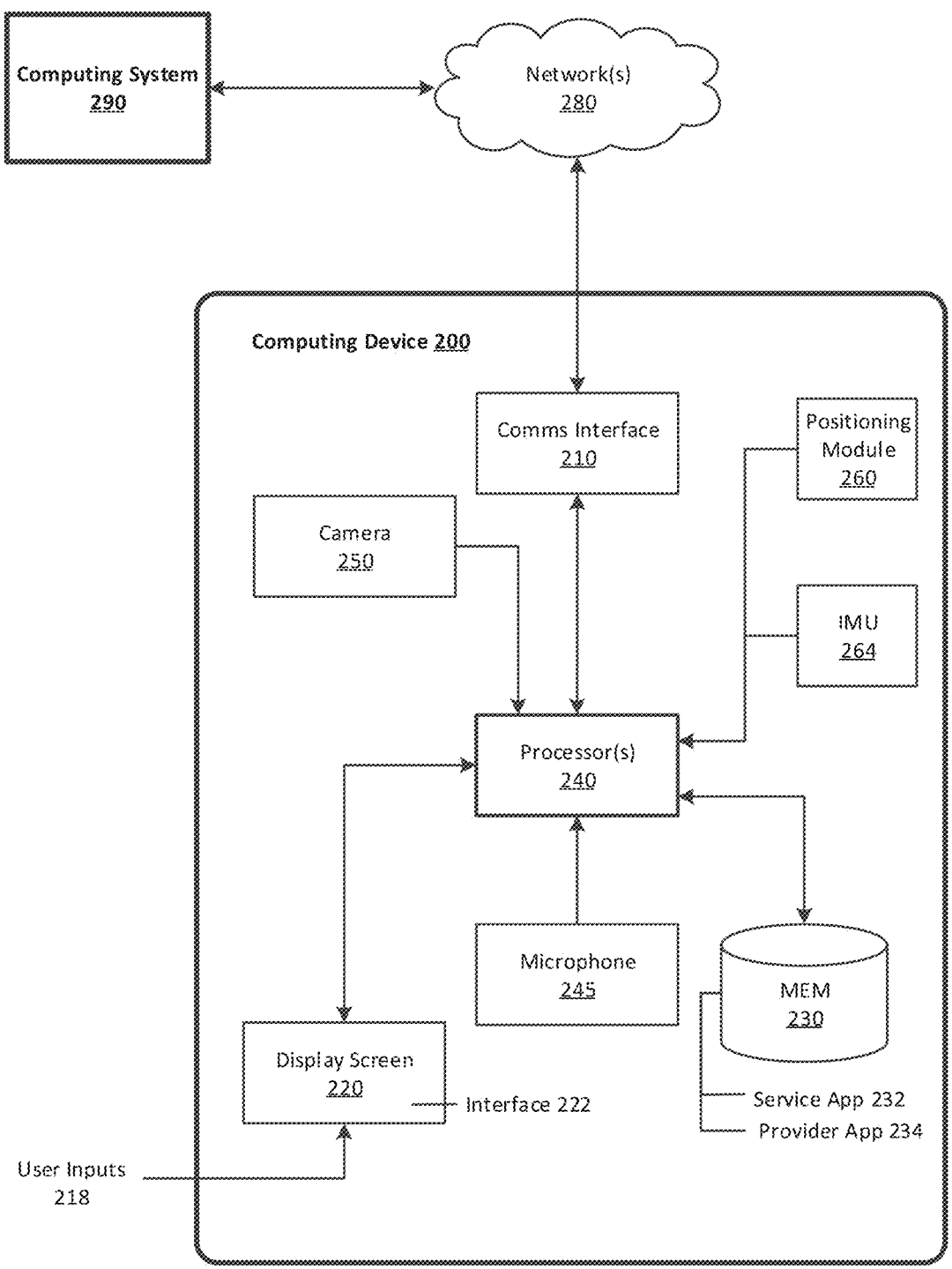
FIG. 2 is a block diagram illustrating an example computing device executing one or more service applications for communicating with a computing system, according to examples described herein.

FIG. 2 is a block diagram illustrating an example computing device executing and operating a delivery service application 232 for communicating with a network computing system, according to examples described herein. In many implementations, the computing device 200 can comprise a mobile computing device, such as a smartphone, tablet computer, laptop computer, VR or AR headset device, and the like. As such, the computing device 200 can include telephony features such as a microphone 245, a camera 250, and a communication interface 210 to communicate with external entities using any number of wireless communication protocols. The computing device 200 can further include a positioning module 260 and an inertial measurement unit 264 that includes one or more accelerometers, gyroscopes, or magnetometers. In certain aspects, the computing device 200 can store a designated on-demand transport service application 232 in a local memory 230. In variations, the memory 230 can store additional applications executable by one or more processors 240 of the computing device 200, enabling access and interaction with one or more host servers over one or more networks 280.

The computing device 200 can be operated by a requesting user 197 through execution of the on-demand service application 232. The computing device 200 can further be operated by a transport provider 190 through execution of a provider application 234. For requesting user 197 implementations, the user can select the service application 232 via a user input on the display screen 220, which can cause the service application 232 to be executed by the processor 240. In response, a user application interface 222 can be generated on the display screen 220, which can display available transport options and enable the user to submit a transport request.

For transport provider 190 implementations, the provider 190 can select the provider application 234 via a user input 218 on the display screen 220, which can cause the provider application 234 to be executed by the processor 240. In response, a provider application interface 222 can be generated on the display screen 220, which can enable the provider to receive transport invitations, and accept or decline these invitations. The provider app interface 222 can further enable the transport provider to select a current status (e.g., available, on-duty, on-break, on-trip, busy, unavailable, and the like).

As provided herein, the applications 232, 234 can enable a communication link with a computing system 290 over one or more networks 280, such as the computing system 100 as shown and described with respect to FIG. 1. The processor 240 can generate user interface features using content data received from the computing system 290 over network 280. Furthermore, as discussed herein, the applications 232, 234 can enable the computing system 290 to cause the generated interface 222 to be displayed on the display screen 220.

In various examples, the positioning module 260 can provide location data indicating the current location of the users and transport providers to the computing system 290 to, for example, enable the computing system 290 to coordinate on-demand transport and implement supply shaping techniques at arrival locations of transit modes, as described herein. In examples described herein, the computing system 290 can transmit content data to the communication interface 210 of the computing device 200 over the network(s) 280. The content data can cause the executing service application 232, 234 to display the respective interface 222 for each executing application 232, 234. Upon selection of a desired transport options by a requesting user, the service application 232 can cause the processor 240 to transmit a transport request to the computing system 290 to enable the computing system 290 to coordinate with transport providers to rendezvous with the users at a selected pickup area and time at the egress location of the transit means.

Methodology

Figure 3:
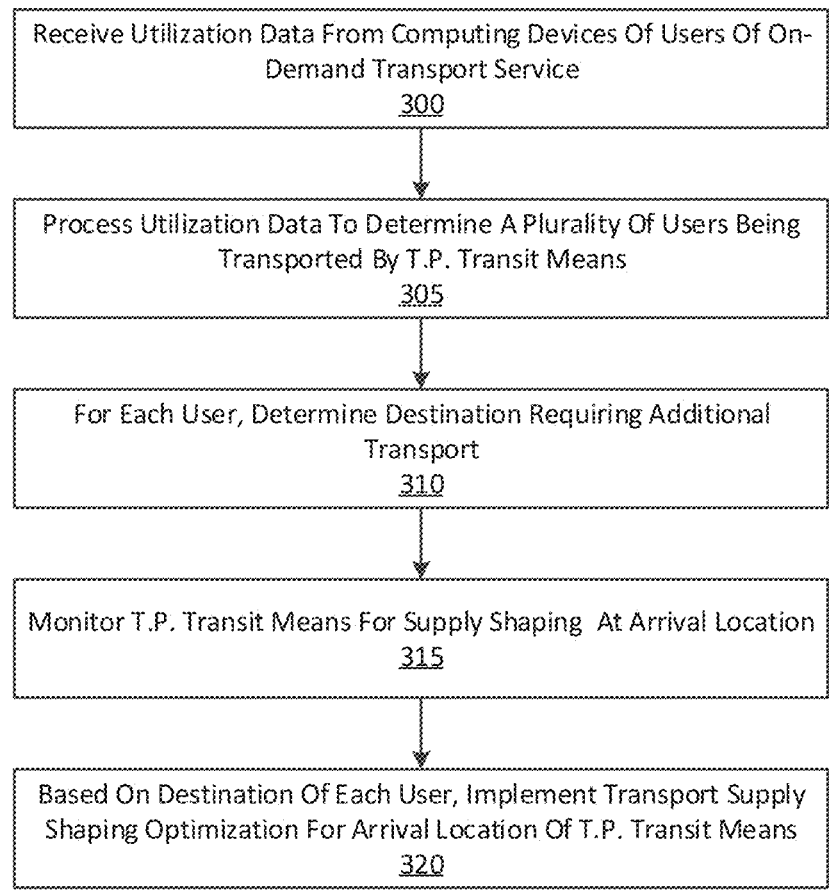
FIG. 3 is a flow chart describing an example method of coordinating transport for transit riders, according to various examples.
Figure 4:
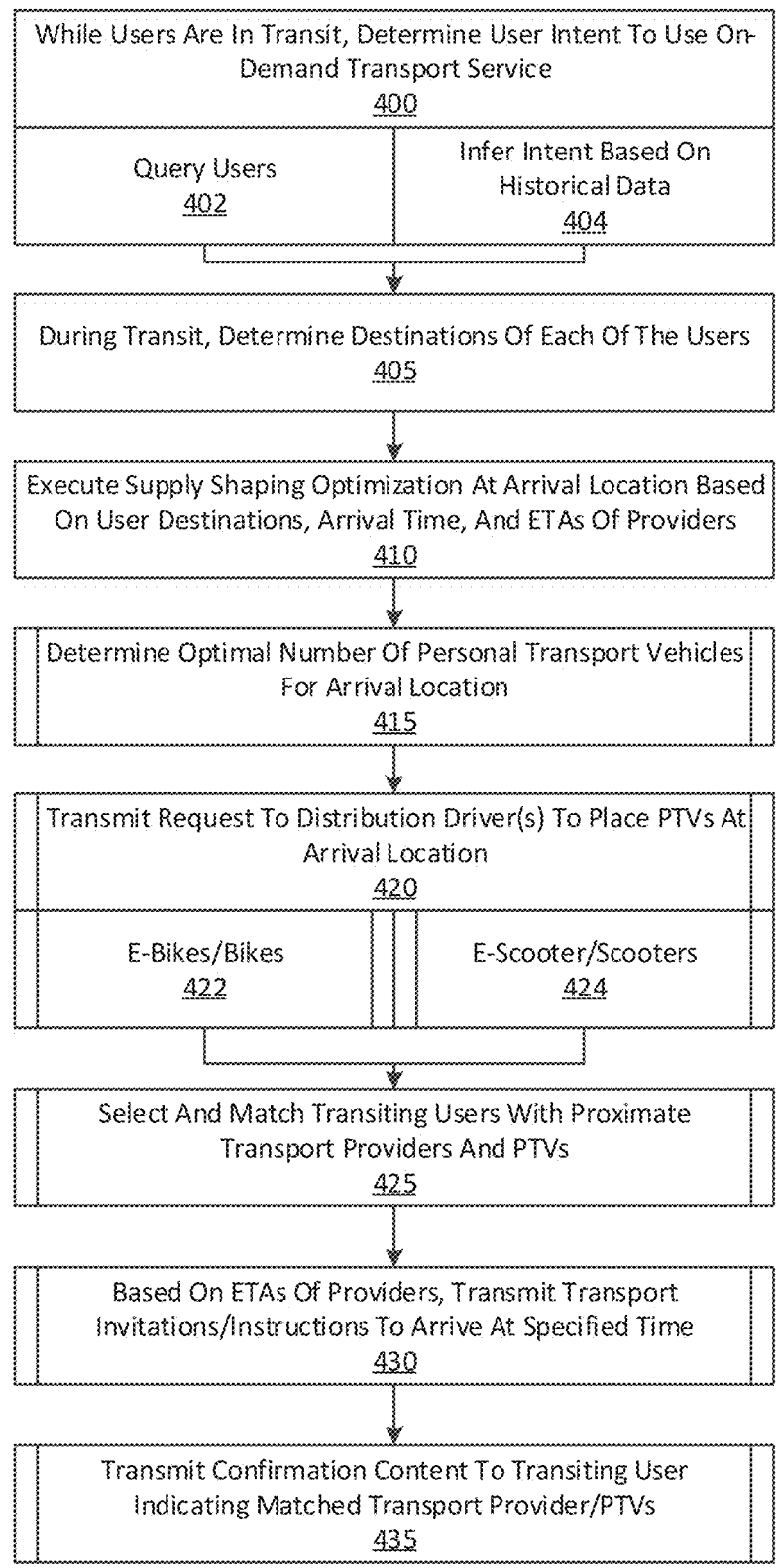
FIG. 4 is a flow chart describing an example method of predictive configuration of transport supply at transit egress areas, according to various examples.

FIGS. 3 and 4 are flow charts describing example methods of coordinating transport for transit riders and preemptive configuration of transport supply at transit egress areas, according to examples described herein. In the below description of FIGS. 3 and 4, reference may be made to reference characters representing various features of FIGS. 1 and 2. Furthermore, the processes described with respect to FIGS. 3 and 4 may be performed by an example computing system 100 as shown and described with respect to FIG. 1. Still further, the processes described with respect to FIGS. 3 and 4 need not be performed in any particular order, and may be combined with other steps shown and described herein.

Referring to FIG. 3, the computing system 100 can receive utilization data from computing devices 195 of users of an on-demand transport service (300). The computing system 100 may process the utilization data to determine a plurality of the users 197 currently being transported by a third-party transit means, such as a bus, train, or ferry (305). The computing system 100 can determine a final destination of each user 197, where the final destination requires additional transport from an arrival location of the third-party transit means (310).

In various examples, the computing system 100 may then monitor the third-party transit means for supply shaping at the arrival location (315). For example, the computing system 100 can determine and update the ETA of the third-party transit means to account for any delays. In certain examples, transit information from third-party transit resources 185 may be inconsistent with observed transit data from the location data of the transiting users 197. In such examples, the computing system 100 may determine that the transit information received from the third-party transit resources is inaccurate (e.g., stating that the transit means is on-time when the location data indicates a delay), and thus prioritize the observed location information from the computing devices 195 of the transiting users 197. According to examples described herein, the computing system 100 may then implement a transport supply shaping optimization for the arrival location based on the respective destinations of each of the transiting users 197 that are to disembark at the arrival location (320). Specifically, upon confirming the users 197 that are to egress the third-party transit means at the arrival location, the computing system 100 can coordinate with proximate transport providers 190 to create optimal transport supply conditions at the arrival location, in order to, for example, minimize wait times for users 197 and transport providers 190, and improve traffic flow through mass transit egress areas.

FIG. 4 describes a method of detecting early intent to utilize the on-demand transport service while users 197 are in transit, and executing supply shaping techniques at mass egress locations of third-party transit means, according to various examples. Referring to FIG. 4, the computing system 100 can determine, while the users 197 are in transit, each user's intent to use the on-demand transport service upon disembarking from a third-party transit means (400). For example, the computing system 100 can initially detect a cluster of users 197 moving in a common trajectory using mapping data and positioning data from the computing devices 195 of those users 197 to determine that they are riding a common mass transit vehicle. While the users 197 are transiting, the computing system 100 can detect the launch of the service application 196 on their computing devices 195 and/or any interactions with the service application 196—which can correspond to the utilization data described with respect to FIG. 1.

In various implementations, the computing system 100 can determine the intent of the transiting users 197 by actively querying the users 197 through communications with their computing devices 195 (402) (e.g., via the service application 196). Additionally or alternatively, the computing system 100 can infer the intent of the transiting users 197 based on historical utilization data (404). In such examples, the computing system 100 can look up historical utilization data in a user profile 112 of each transiting user 197 and determine times of day, days of the week, and common destinations that align with the user's current trajectory on the third-party transit means (e.g., a work location in the early morning on a weekday). In certain implementations, the computing system 100 can make some inferences and/or query transiting users 197 for other information, such as a desired transport option upon arrival, and/or a confirmation of a final destination.

Accordingly, the computing system 100 can either infer or directly query the transiting users 197 for their final destinations, intent to use on-demand transport, transport preferences, and the like (405). In some aspects, during the supply shaping optimization, the computing system 100 can provide suggested multi-mode transport options from the arrival location to the user's final destination, such as a carpool ride from the arrival location to a second location in the direction of travel to the user's final destination, and then a second mode of transport (e.g., an electric scooter) from the second location to the final destination. Prior to, during, and/or after determining the final destinations of the transiting users 197, the computing system 100 can perform a transport supply shaping optimization for a given arrival location of the third-party transit means (410) (e.g., a train station).

As described herein, the optimization can comprise inputs corresponding to the number of transiting users 197 that will disembark from the transit means at the particular arrival location, each user's preferred and/or permitted transport option upon arriving (e.g., standard rideshare, carpool, personal transport, etc.), the final destinations of those users 197, the ETA of the transit means, and the transport supply conditions proximate to the arrival location. These transport supply conditions can correspond to the number of available and/or on-trip transport providers 190 within a certain proximity of the arrival location, the number of available personal transport vehicles (e.g., e-scooters) at the arrival location, and the ETAs of each transport provider 190 and/or personal transport distribution driver to the arrival location.

In various examples, the supply shaping optimization can yield a number or range for an optimal quantity of personal transport vehicles (e.g., scooters or bicycles) for the arrival location (e.g., between fifteen and twenty for a disembarking user base) (415). Upon determining the optimal number or range of personal transport vehicles—and the current number of personal transport vehicles at the arrival location—the computing system 100 can transmit one or more requests to the driver of a distribution vehicle (e.g., a van transporting scooters or bicycles) to place a set number of personal transport vehicles at a designated area of the arrival location (420). In some aspects, the personal transport vehicles can include identification codes or vehicle identification numbers, which the computing system 100 can transmit to matched transiting user 197 to enable the users 197 to identify and unlock a specifically assigned personal transport vehicle (e.g., using a scanned QR code). As described herein, such personal transport vehicles can comprise e-bikes or regular bikes (422) and/or e-scooters or regular scooters (424).

Additionally, the computing system 100 can select and match the transiting users 197 with proximate transport providers 190 and/or personal transport vehicles (425). In certain examples, the computing system 100 can transmit transport invitations or instructions to each of the matched transport providers 190 to arrive at the arrival location of the third-party transit means at or near a particular time associated with the arrival of the transit means (430) (e.g., two minutes after arrival). In certain examples, the computing system 100 can further alleviate traffic congestion at the arrival location by staggering the arrival of transport providers 190, and/or providing different pick-up locations to the users 197 to spread out the traffic into and out of the arrival location. Once the matches are made, the computing system 100 can transmit content data to the computing devices 195 of the transiting users 197 indicating the matched transport provider 190 or a notification to utilize an awaiting personal transport vehicle (435).

Accordingly, the functions of the computing system 100 described herein can more seamlessly integrate mass transit with on-demand transport at any particular egress location. It is contemplated that the supply shaping techniques described herein can be significantly effective for mass transit egress locations of relatively stable transit modes, such as ferries and trains, in which ETAs and user intent can be determined well prior to arrival (e.g., twenty minutes to more than one hour). With knowledge of user intent well prior to arrival, the supply shaping optimizations described herein can achieve various technical as well as practical effects, such as more precise remote coordination of transport, real-time transport and traffic planning and alleviation, and significant overall cost savings due to increased utilization of transport modes.

Hardware Diagram

Figure 5:
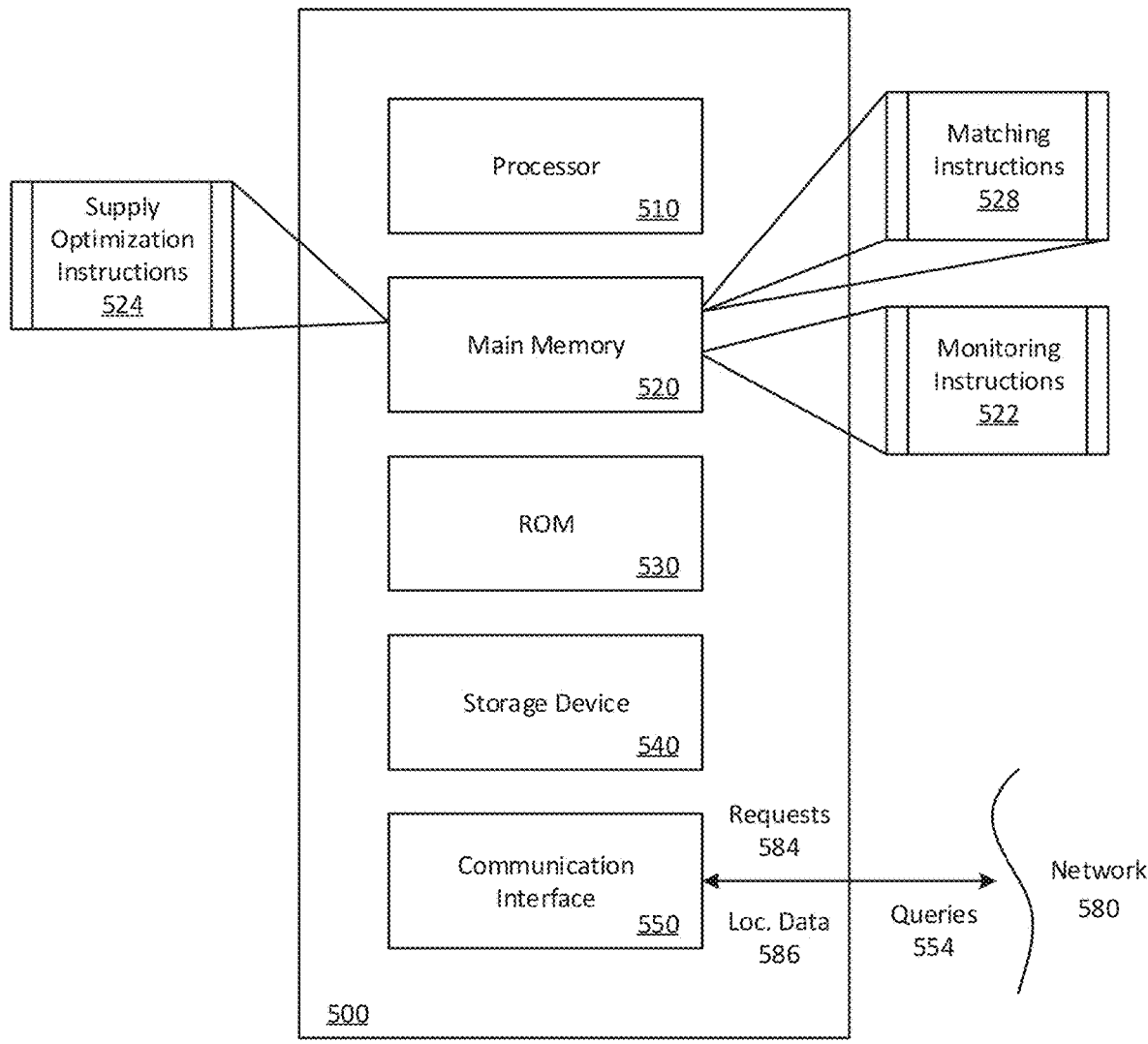
FIG. 5 is a block diagram that illustrates a computer system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service, such as described in FIGS. 1 through 4. In the context of FIG. 1, the computer system 100 may be implemented using a computer system 500 such as described by FIG. 5. The computer system 100 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, one or more servers, one or more databases, and/or one or more self-driving vehicles. In accordance with examples, the computer system 500 receives requests from mobile computing devices of individual users. The executable instructions stored in the memory 530 can include transit monitoring instructions 522, supply optimization instructions 524, and transport matching instructions 528.

By way of example, the instructions and data stored in the memory 520 can be executed by the processor 510 to implement the functions of an example computing system 100 of FIG. 1. In various examples, the processor 510 can execute the monitoring instructions 528 to receive location data 586 from requesting users 197 and determine the ETA of a particular third-party transit means, such as a train or ferry. In certain implementations, the processor 510 executes the matching instructions 528 to receive transport requests 584 from requesting users 197, transmitting queries to transiting users 197 matching the users 197 with available transport providers 190. The processor 510 can further execute supply optimization instructions 524, which cause the processor 510 to most optimally configure transport supply at an arrival location of the third-party transit means, given the various factors described herein.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system implementing a transport service, the computing device comprising:
a network communication interface to communicate, over one or more networks, with computing devices of requesting users and transport providers utilizing the transport service;
one or more processors; and
a memory storing instructions that, when executed by the one or more processors, cause the computing system to:
receive, over the one or more networks, utilization data from the computing devices of the requesting users, wherein the utilization data corresponds to the computing devices of the requesting users operating an executing application, specific to the transport service, that transmits location data to the computing system;
process the utilization data by (i) executing a transit monitoring engine on the utilization data to detect a cluster of requesting users currently being transported by a third-party transit vehicle to an arrival location of the third-party transit vehicle, and (ii) executing a transport coordination engine on the utilization data to determine, for each requesting user in the cluster, an intent of the requesting user, the intent corresponding to a probability that the requesting user will utilize the transport service via the executing application upon arrival at the arrival location of the third-party transit vehicle;
based on the location data received from the computing devices of the cluster of requesting users, dynamically determine an estimated time of arrival of the third-party transit vehicle to the arrival location;
for each requesting user of the cluster of requesting users, determine a destination that requires additional transport from the arrival location of the third-party transit vehicle; and
based on (i) the destination of each requesting user of the cluster of requesting users, (ii) the estimated time of arrival of the third-party transit vehicle to the arrival location, and (iii) the determined intent of each requesting user to utilize the transport service, transmit, over the one or more networks, a set of transport facilitation requests to the computing devices of a selected set of the transport providers to facilitate transport for the cluster of requesting users at the arrival location of the third-party transit vehicle.

2. The computing system of claim 1, further comprising:
a database storing a user profile of each respective user of the cluster of requesting users, the user profile indicating historical utilization information corresponding to historical usage of the transport service by the respective user;
wherein the executed instructions cause the computing system to further determine the intent of the respective user to travel to the destination of the respective user by performing a lookup of the historical utilization information in the user profile of the respective user.

3. The computing system of claim 1, wherein the executed instructions further cause the computing system to:
determine, for a first user of the cluster of requesting users, a multi-modal transport plan to transport the first user from the arrival location of the third-party transit vehicle to the destination of the first user;
wherein the set of transport facilitation requests enables one or more of the selected set of the transport providers to facilitate the multi-modal transport plan for the first user from the arrival location of the third-party transit vehicle to the destination of the first user.

4. The computing system of claim 3, wherein the multi-modal transport plan comprises multiple means of transport arranged for the first user from the arrival location to the destination of the first user, the multiple means of transport comprising a plurality of: a human-driven rideshare vehicle, a shared bicycle, a shared scooter, or an autonomously-driven vehicle.

5. The computing system of claim 1, wherein the third-party transit vehicle comprises one of a train, a ferry, an airplane, or a bus.

6. A non-transitory computer readable medium storing instructions that, when executed by one or more processors of a computing system, cause the computing system to:
receive, over one or more networks, utilization data from computing devices of requesting users of a transport service, wherein the utilization data corresponds to the computing devices of the requesting users operating an executing application, specific to the transport service, that transmits location data to the computing system;
process the utilization data by (i) executing a transit monitoring engine on the utilization data to detect a cluster of requesting users currently being transported by a third-party transit vehicle to an arrival location of the third-party transit vehicle, and (ii) executing a transport coordination engine on the utilization data to determine, for each requesting user in the cluster, an intent of the requesting user, the intent corresponding to a probability that the requesting user will utilize the transport service via the executing application upon arrival at the arrival location of the third-party transit vehicle;
based on the location data received from the computing devices of the cluster of requesting users, dynamically determine an estimated time of arrival of the third-party transit vehicle to the arrival location;
for each requesting user of the cluster of requesting users, determine a destination that requires additional transport from the arrival location of the third-party transit vehicle; and
based on (i) the destination of each requesting user of the cluster of requesting users, (ii) the estimated time of arrival of the third-party transit vehicle to the arrival location, and (iii) the determined intent of each requesting user to utilize the transport service, transmit, over the one or more networks, a set of transport facilitation requests to computing devices of a selected set of transport providers to facilitate transport for the cluster of requesting users at the arrival location of the third-party transit vehicle.

7. The non-transitory computer readable medium of claim 6, wherein the executed instructions cause the computing system to further determine the intent of the respective user to travel to the destination of the respective user by performing a lookup, in a database storing a user profile of each respective user of the cluster of requesting users, of historical utilization information corresponding to historical usage of the transport service by the respective user.

8. The non-transitory computer readable medium of claim 6, wherein the executed instructions further cause the computing system to:
determine, for a first user of the cluster of requesting users, a multi-modal transport plan to transport the first user from the arrival location of the third-party transit vehicle to the destination of the first user;

wherein the set of transport facilitation requests enable one or more of the selected set of the transport providers to facilitate the multi-modal transport plan for the first user from the arrival location of the third-party transit vehicle to the destination of the first user.

9. The non-transitory computer readable medium of claim 8, wherein the multi-modal transport plan comprises multiple means of transport arranged for the first user from the arrival location to the destination of the first user, the multiple means of transport comprising a plurality of: a human-driven rideshare vehicle, a shared bicycle, a shared scooter, or an autonomously-driven vehicle.

10. The non-transitory computer readable medium of claim 6, wherein the third-party transit vehicle comprises one of a train, a ferry, an airplane, or a bus.

11. A computer-implemented method of coordinating transport, the method being performed by one or more processors and comprising:

receiving, over one or more networks, utilization data from computing devices of requesting users of a transport service, wherein the utilization data corresponds to the computing devices of the requesting users operating an executing application, specific to the transport service, that transmits location data to the computing system;

processing the utilization data by (i) executing a transit monitoring engine on the utilization data to detect a cluster of requesting users currently being transported by a third-party transit vehicle to an arrival location of the third-party transit vehicle, and (ii) executing a transport coordination engine on the utilization data to determine, for each requesting user in the cluster, an intent of the requesting user, the intent corresponding to a probability that the requesting user will utilize the transport service via the executing application upon arrival at the arrival location of the third-party transit vehicle;

based on the location data received from the computing devices of the cluster of requesting users, dynamically determining an estimated time of arrival of the third-party vehicle to the arrival location;

for each requesting user of the cluster of requesting users, determining a destination requiring additional transport from the arrival location of the third-party transit vehicle; and based on (i) the destination of each requesting user of the cluster of requesting users, (ii) the estimated time of arrival of the third-party transit vehicle to the arrival location, and (iii) the determined intent of each requesting user to utilize the transport service, transmitting, over the one or more networks, a set of transport facilitation requests to computing devices of a selected set of transport providers to facilitate transport for the cluster of requesting users at the arrival location of the third-party transit vehicle.

12. The method of claim 11, wherein determining the intent of the respective user to travel to the destination of the respective user comprises performing a lookup, in a database storing a user profile of each respective user of the cluster of requesting users, of historical utilization information corresponding to historical usage of the transport service by the respective user.

13. The method of claim 11, further comprising:

determining, for a first user of the cluster of requesting users, a multi-modal transport plan to transport the first user from the arrival location of the third-party transit vehicle to the destination of the first user;

wherein the set of transport facilitation requests enable one or more of the selected set of the transport providers to facilitate the multi-modal transport plan for the first user from the arrival location of the third-party transit vehicle to the destination of the first user.

14. The method of claim 13, wherein the multi-modal transport plan comprises multiple means of transport arranged for the first user from the arrival location to the destination of the first user, the multiple means of transport comprising a plurality of: a human-driven rideshare vehicle, a shared bicycle, a shared scooter, or an autonomously-driven vehicle.

* * * * *